Figure 1:
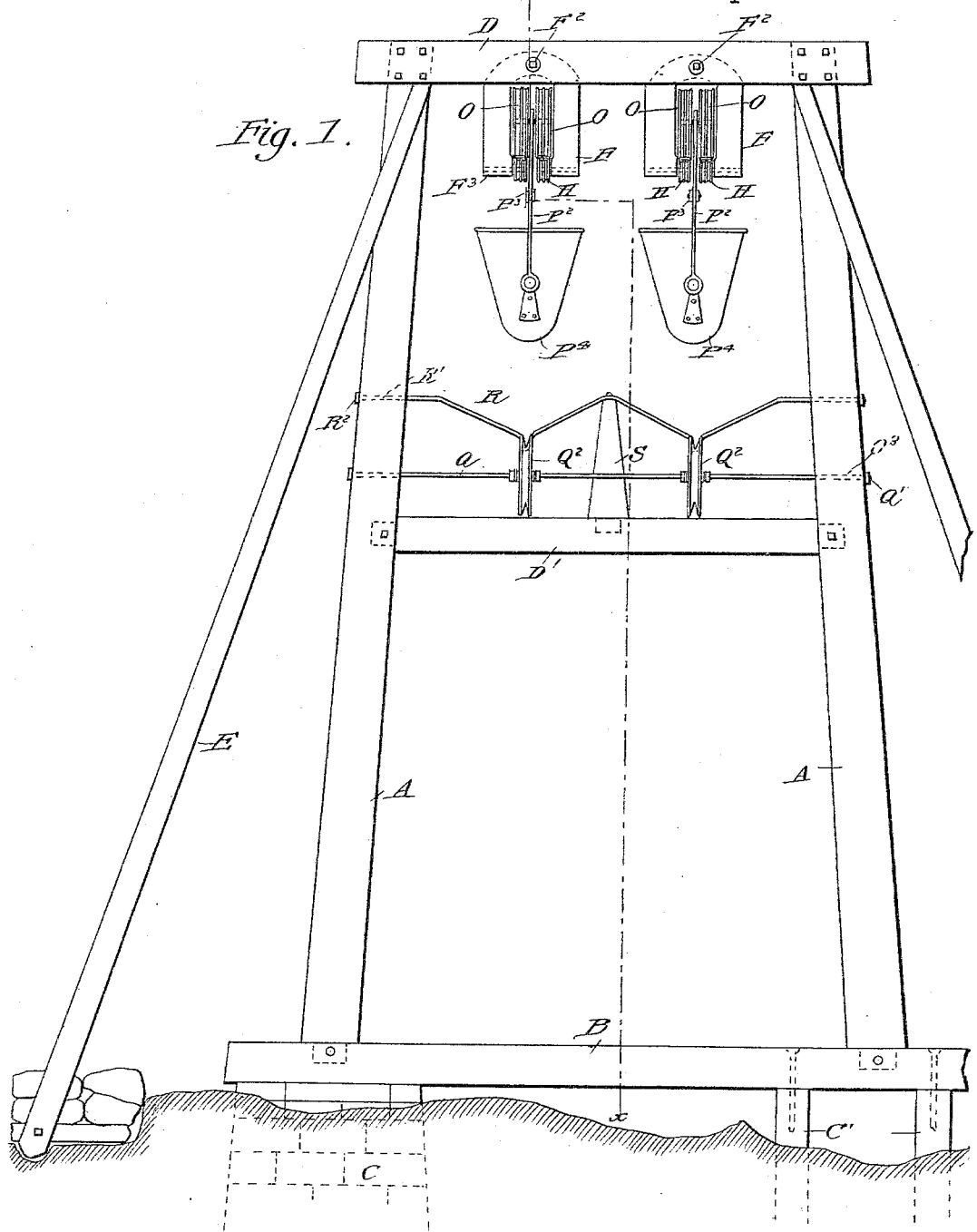

(No Model.) 5 Sheets—Sheet 1.

A. H. DE CAMP.
AERIAL TRAMWAY.

No. 411,584. Patented Sept. 24, 1889.

WITNESSES:
INVENTOR:
A. H. De Camp
BY
Munn & Co.
ATTORNEYS.

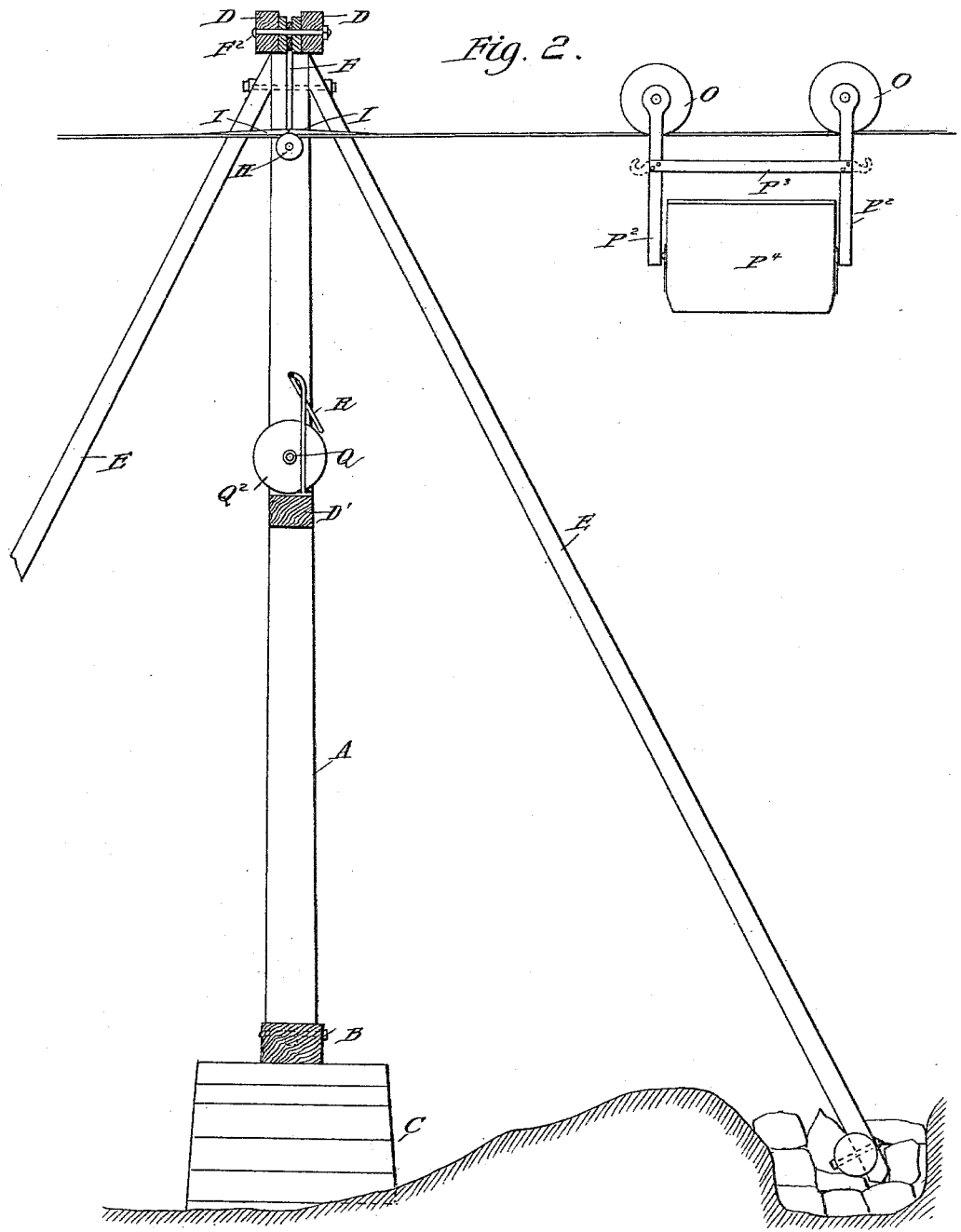

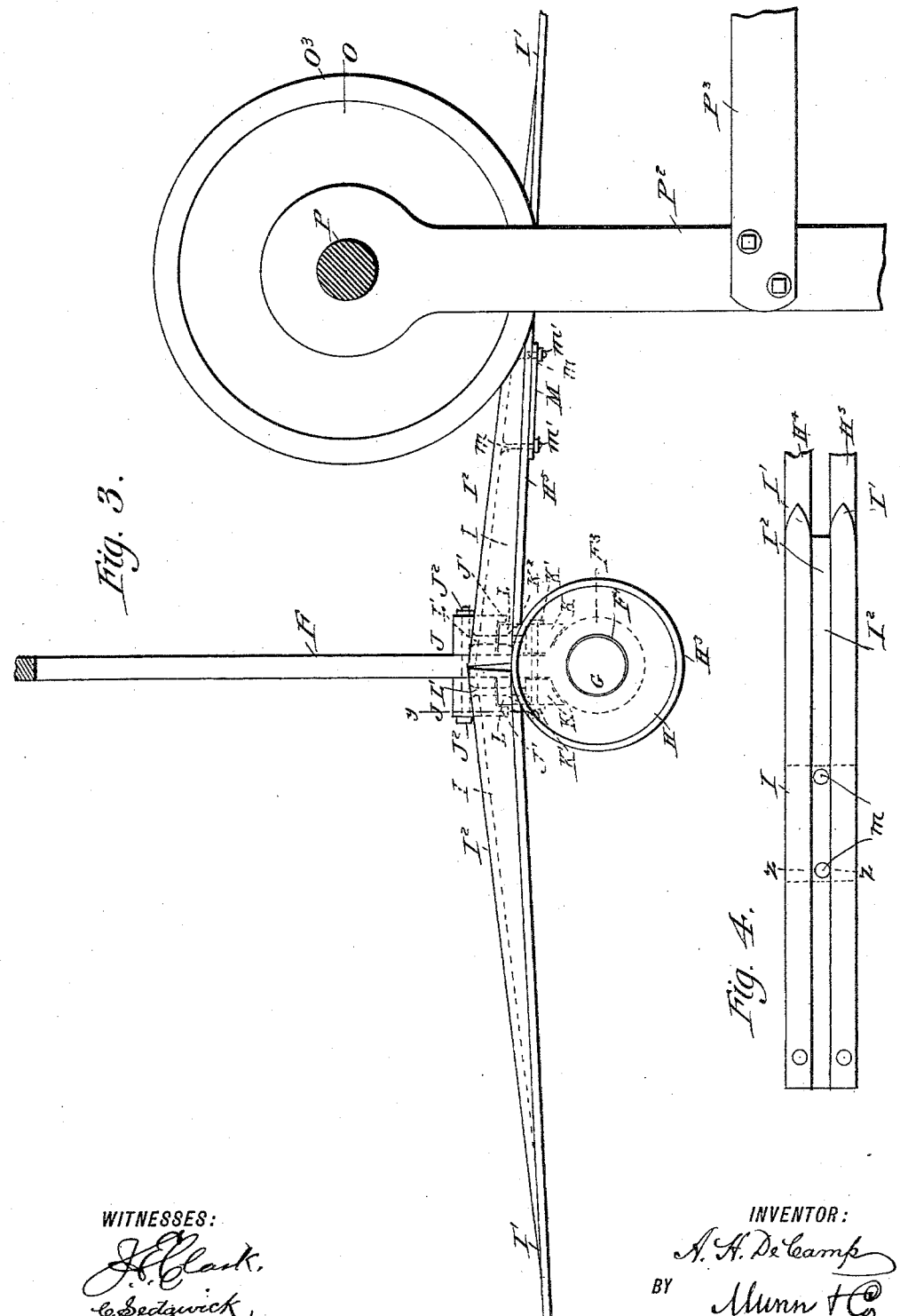

(No Model.)  5 Sheets—Sheet 4.
A. H. DE CAMP.
AERIAL TRAMWAY.
No. 411,584. Patented Sept. 24, 1889.
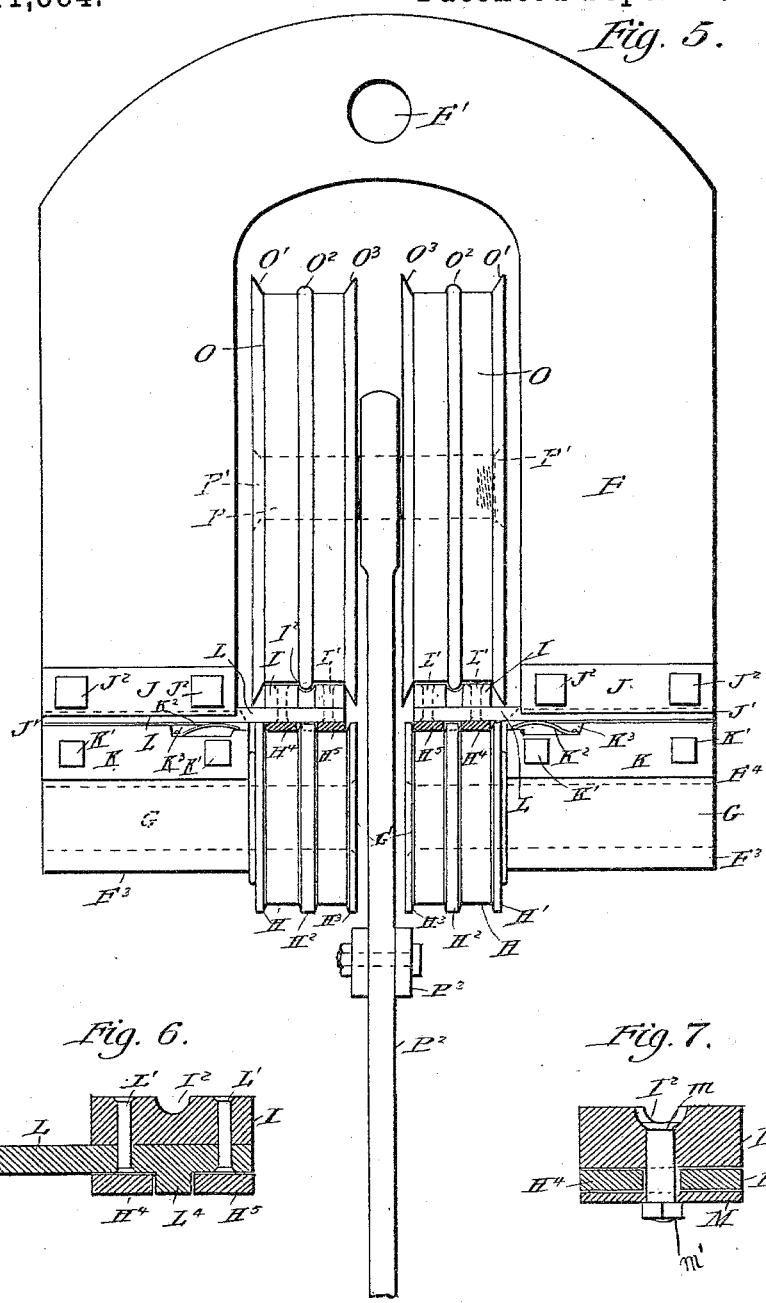
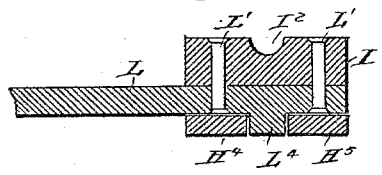
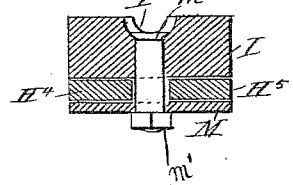
WITNESSES:
INVENTOR:
A. H. De Camp
BY Munn & Co.
ATTORNEYS.

(No Model.)  5 Sheets—Sheet 5.
A. H. DE CAMP.
AERIAL TRAMWAY.
No. 411,584.  Patented Sept. 24, 1889.
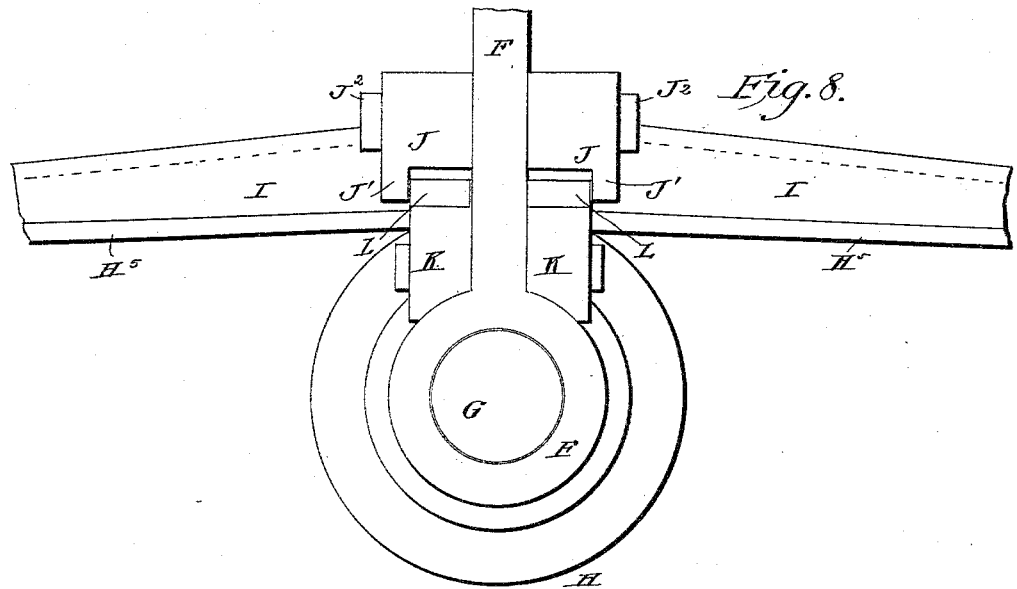
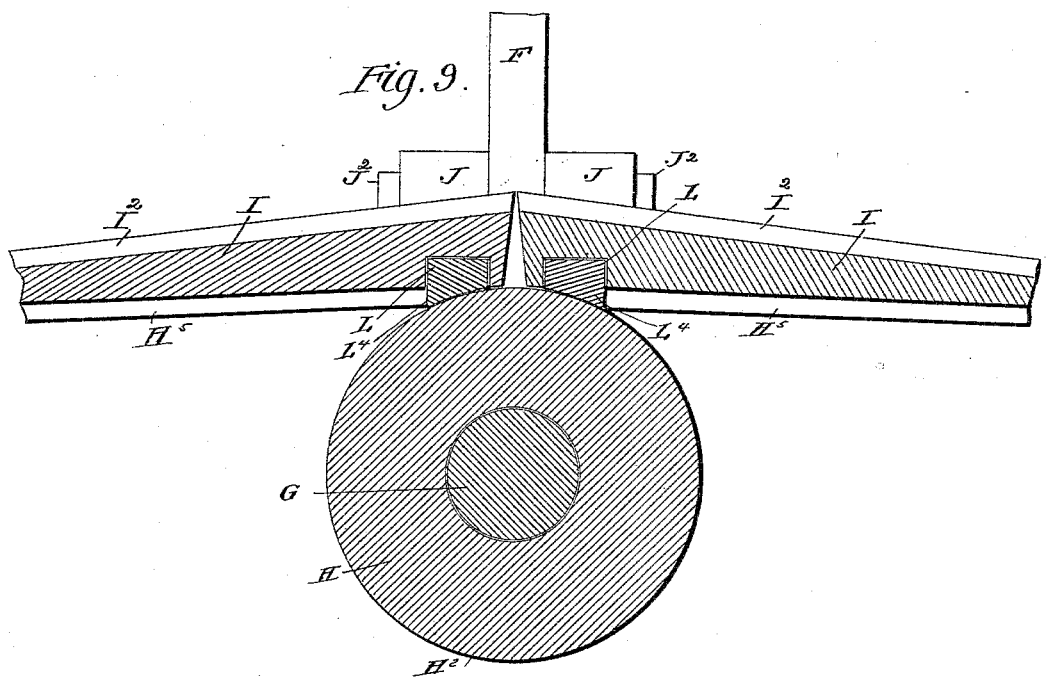
WITNESSES:
INVENTOR:
A. H. De Camp
BY Munn & Co.
ATTORNEYS.

UNITED STATES PATENT OFFICE.

ALFRED H. DE CAMP, OF BOONTON, NEW JERSEY.

AERIAL TRAMWAY.

SPECIFICATION forming part of Letters Patent No. 411,584, dated September 24, 1889.

Application filed September 6, 1888. Serial No. 284,687. (No model.)

*To all whom it may concern:*

Be it known that I, ALFRED H. DE CAMP, of Boonton, in the county of Morris and State of New Jersey, have invented a new and Improved Aerial Tramway, of which the following is a full, clear, and exact description.

The objects of my invention are to construct an aerial tramway, and to provide suitable supports and keepers and means of transport upon the same.

Reference is to be had to the accompanying drawings, forming a part of this specification, in which similar letters of reference indicate corresponding parts in all the figures.

Figure 1 represents a front elevation of a double-track tramway embodying my invention. Fig. 2 is a section on the line $x\ x$ of Fig. 1. Fig. 3 is an enlarged detail side elevation, partly in section. Fig. 4 is a top plan detail of the tramway and incline. Fig. 5 is an enlarged detail of the yoke and connected parts, the tramways being shown in section. Fig. 6 is an enlarged section taken on the line $y\ y$ of Fig. 3. Fig. 7 is a section taken on the line $z\ z$ of Fig. 4. Fig. 8 is a side elevation of tramway at one of the hangers F and inclines, and Fig. 9 is a longitudinal vertical section thereof through the central flange $H^2$ of the guiding or supporting roller.

Any frame of suitable construction may be employed for the support and construction of this tramway. The frame shown by the drawings consists of two upright posts A A, secured to a base cross-piece B, and said cross-piece may be mounted upon masonry C, or secured to posts C', driven into the ground, as shown in Fig. 1. The upper ends of the posts A are connected by two cross-beams D, rigidly bolted thereto. D' is a cross-bar, having its respective ends secured midway on the posts A, and E E are side braces for supporting the frame.

A supporting-wheel H is provided with three or more flanges $H'\ H^2\ H^3$, between which flanges the flexible rails $H^4\ H^5$ rest upon the wheel. The flanges $H'$ and $H^3$ prevent outward lateral displacement of the flexible rails $H^4$ and $H^5$. The intermediate flange $H^2$ (or flanges, as the case may be) determines by its width the minimum distance at the support by which the flexible rails are separated. The rails $H^4\ H^5$ are rigidly secured at their opposite ends to supports (not shown) at the end of the tramway; but between their ends they have no fixed connection with any support, but merely rest upon supporting-wheels H.

The flexible rails are flat and oblong in cross-section, and the advantage of this shape over round and other forms is that an increased flexibility is obtained without lessening the tensile strength. The wheel H supports the flexible rails, it being itself supported upon the shaft G, said shaft being provided with an enlarged inner end G' to retain the wheel, and said shaft extending outwardly to one side a sufficient distance and of proper shape for the rigid affixment of it to any suitable support—in this case to one arm of the yoke F.

The cross-bar L, resting upon or passing across the flexible rails $H^4 H^5$, is prevented from any considerable movement in any direction by means of suitable keepers attached to any suitable fastening adjacent to the tramway, such keepers being furnished in this case by the adjacent side of the yoke F and the block or projection J, provided with a downwardly-extending flange J' and the underlying block or projection K. There is sufficient space between these said blocks to permit a slight vertical movement of the cross-bar L.

The under side of the bar L is provided with the downwardly-extending lug $L^4$, Fig. 6. This lug extends downwardly between the flexible rails $H^4\ H^5$ in vertical alignment with the central flange or rib $H^2$ of the guide-wheel H, and serves to prevent an appreciable movement of the bar in a direction across the rails. The cross-bar L, being by its upper keeper allowed but slight elevation above the rails, prevents said rails from getting out of the supporting-wheels and flanges by an upward movement. There is also sufficient space between the yoke and the downwardly-projecting flange J' to permit of a pivotal movement of the bar L. The space above the bar L within its keeper is only sufficient to permit the elevation of said bar a sufficient distance above the wheel H and flexible rails $H^4\ H^5$ for actual clearance of the same. The spring $K^2$ underneath the bar L is for the purpose of elevating the bar L to said position.

The two blocks J J above the bars L L are secured to their respective sides of the yoke by the bolts J², or in any suitable manner. Likewise the blocks K K below the bars L are secured. Each block K is recessed on its upper inner side at K³, Fig. 5, and each recess is provided with a spring K².

The grooved double inclines I, the abutting ends of which are the greater, and which ends approach very nearly or touch at the top, gradually separate, descending toward the track. To permit of a slight circular vertical movement of the outward ends of said inclines, and thus prevent said abutting ends from being thrust against each other, these inclines are recessed at or near their abutting ends on the under side crosswise of their length to receive the inner ends of the cross-bars L, so that the under sides of the cross-bars shall be flush with the under sides of the inclines, said recesses to exceed the width of said cross-bars in longitudinal direction of the inclines to permit of slight horizontal movement of the inclines upon the cross-bars, if so desired. The inclines are each attached to their respective cross-bars L by one or more rivets or bolts L', substantially as shown. Each incline tapers at its outward ends I'. (Shown in Fig. 4.) These inclines may be provided with a downwardly-projecting part for most of their length, said part to lie between the rails and serve as a lateral guide for the whole incline.

F is a yoke pivotally suspended from any suitable support by any of the well-known methods. The lower end F³ of each arm of the yoke is enlarged, and each of said enlarged ends is provided with a cross-opening F⁴, in which is secured the inwardly-projecting shaft G, and near the end of each arm are secured keepers for a cross-bar, as hereinbefore described.

A plate M, Fig. 3, is secured under the rails and to the incline by means of bolts $m$. The plate M steadies the bolts $m$ and prevents the outside end of incline rising from any cause to any undesired distance. There is a space between plate M and the under side of rails. The heads of these bolts are countersunk in the groove of the incline, Figs. 3 and 4, and the lower ends of said bolts are screw-threaded and provided with nuts $m'$. The body of each bolt $m$ is of a diameter nearly equal to the space between the two rails, so as to keep the incline in a practically fixed position with relation to the rails and prevent lateral displacement of incline.

The carrier-wheels O O are each provided with outside and intermediate flange or flanges—in this presentation O' O² O³. A shaft P, having an enlarged end P', connects said wheel or wheels to a hanger-arm. The hanger-arm P² is either rigidly attached to or boxed upon the shaft P between the wheels O, and each wheel is capable of turning upon said shaft. The intermediate flange or flanges upon wheel O keeps the flexible rails a given distance apart at the point of travel, and occupies the groove in incline I when wheel O is passing over said incline. There are two sets of carrier-wheels, each having a hanger-arm, as shown in Fig. 2. The hanger-arms are also rigidly connected by the side bars P³, said bars and connections causing the corresponding sides of the hanger-arms to remain in the same vertical plane, said hanger-arms communicating the same ability to corresponding sides of wheels of each truck through the axle P.

The dotted hooks, Fig. 2, indicate that at or below that point any suitable form of carriage may be attached.

The object of the shaft Q is to support pulleys Q², which pulleys receive and carry the drawing-rope. The bent rod R is to guide said rope back to its pulley when for any reason displaced. When the rope is in the wheel, it does not touch the guide, and when said rope follows down the guide R it does not touch the edge of flanges of pulley Q². These pulleys and the greatest depression of the bent rod R may be supported and maintained in the line of travel of drawing-rope by any suitable attachment to any suitable frame or support.

The operation is as follows: The carrier P⁴ may be actuated by cable or in any suitable manner. The bent rods R and pulleys are to support and hold the cables in the line of travel of the respective carriers. The object of the grooved incline is to elevate the flanges of the carrier-wheels O above the flanges of the wheels H, so that the former wheels may pass freely over the latter. The weight of a carrier will cause the rails H⁴ H⁵ to slightly sag to one side of the support, and this sagging movement will cause the rails to move over and rotate their supporting-wheels H. These rotary supports (the wheels H) are to prevent friction when the rails move or sag. The inclines, being fixed to the cross-bars, maintain their position longitudinally when the rails move. When the rails slide, they move between the plate M and incline, Figs. 3 and 4, the bolts $m$, which lie between the rails, holding the plate M sufficiently loose to permit of this movement. The function of each spring K² is to normally elevate the bar L and inclines above the rails, so as to permit said rails to move freely upon their supports. I also contemplate the use of a fixed bearing for the rails to slide in as a substitute for the wheels H.

Having thus fully described my invention, I claim as new and desire to secure by Letters Patent—

1. In a suspended railway, the herein-described suspended track formed of continuous rails less in vertical section than in their other dimensions, the said rails being supported at intervals throughout the track, whereby they are allowed to flex between said supports, substantially as set forth.

2. The combination, in an elevated tramway, with the grooved supporting-rollers, of the track formed of continuous parallel oblong bars resting at intervals between their terminals flatwise in the grooves of the said rollers to slide therein, substantially as set forth.

3. In an aerial tramway, the combination, with two parallel rails supported loosely at intervals throughout the length of the track, of parallel cross-bars extending across the upper side of the track over the supports and oppositely-placed inclines supported at their adjacent larger ends on said cross-bars and extending freely along the upper sides of the tracks, substantially as set forth.

4. In an aerial tramway, the combination, with two parallel rails, of a cross-bar keeper for said rails, a keeper for said cross-bar, and a spring to elevate said cross-bar.

5. In an aerial tramway, the combination, with two parallel rails, of a flanged way for said rails, means of supporting the flanged way, substantially as described, a keeper-bar for said rails, and an incline attached to said keeper-bar and mounted above the rails, substantially as shown and described.

6. In an aerial tramway, the combination, with two parallel rails, of a flanged way for said rails, a means of support for said flanged way, a keeper-bar for said rails, and a grooved incline secured to said keeper-bar, said keeper-bar being supported and maintained in position, substantially as shown and described.

7. In an aerial tramway, the combination, with two parallel rails, of a flanged way for said rails, a means of support for said way, and a keeper-bar for said rails, means of securing said keeper-bar in position, as described, and a grooved incline attached to said keeper-bar, as described, and mounted above the rails and extending downward between the rails to hold said incline in a given relation to the rails, as shown and described.

8. In an aerial tramway, the combination, with two parallel rails, of a flanged way for said rails, means of support for said flanged way, a keeper-bar for said rails, a grooved incline mounted above the rails and attached to said keeper-bar, and the plate M under the rails connected to the incline above the rails, as and for the purpose described.

9. In an aerial tramway, the combination, with two parallel rails, of an incline mounted above the rails and the bolts $m$, passing down between the rails connecting the incline and the plate M, and nearly filling the space between the rails, as and for the purpose described.

10. In an aerial tramway, the combination, with two parallel rails, of a keeper-bar for said rails, a yoke, and attachments thereto for maintaining said keeper-bar in proper relation to said rails, as shown and described.

11. In an aerial tramway, the combination, with two parallel rails, of a keeper-bar for said rails, a yoke on which said keeper is mounted, and a spring to elevate said bar, as shown and described.

12. In an aerial tramway, the combination, with two parallel rails, of a keeper-bar for said rails, a yoke, said keeper secured to said yoke and elevated, as described, and a lug upon said keeper-bar extending downwardly and interposed between the rails, as shown and described.

13. In an aerial tramway, the combination, with two parallel rails, of a flanged way on which said rails rest, a keeper-bar for said rails, secured substantially as described, a double grooved incline secured to two keeper-bars and mounted above the rails, a flanged traveling wheel provided with a hanger-arm, and a carrier suspended by said arm, substantially as shown and described.

14. In an aerial tramway, the combination, with two parallel rails, of a grooved double incline mounted above the rails and two flanged wheels, and two hanger-arms rigidly connected, as shown and described.

15. In an aerial tramway, the combination of two compound rails formed each of two or more parallel rails supported and kept by each arm of a yoke, each arm having attached to it, as described, an axle having a flanged way for each compound rail, and having proper keepers and springs for keeper-bars, two keeper-bars for each arm, a grooved incline attached to each keeper-bar, all members constructed substantially as shown and described, and a wheel on each side of each hanger-arm, flanged as required and turning upon the connecting-shaft, the hanger-arms also boxed to shaft, permitting shaft to turn, if required, substantially as shown and described.

16. In an aerial tramway, a carrier and means for supporting the same, in combination with a cable for moving the carrier and a pulley and guide-rod R for supporting and maintaining said cable in a particular line, substantially as shown and described.

ALFRED H. DE CAMP.

Witnesses:
 E. M. CLARK,
 C. SEDGWICK.